United States Patent
Byun et al.

(10) Patent No.: US 6,529,349 B1
(45) Date of Patent: Mar. 4, 2003

(54) SINGLE LEVER BI-DIRECTIONAL INERTIA LATCH

(75) Inventors: Yongkyu Byun, San Jose, CA (US); Hae Sung Kwon, San Jose, CA (US); Shiao-Hua Chen, Palo Alto, CA (US); Pyongwon Yim, Sunnyvale, CA (US)

(73) Assignee: Samsung Electronics Company (KR)

( * ) Notice: Subject to any disclaimer, the term of this patent is extended or adjusted under 35 U.S.C. 154(b) by 0 days.

(21) Appl. No.: 09/704,307

(22) Filed: Nov. 1, 2000

Related U.S. Application Data

(60) Provisional application No. 60/166,089, filed on Nov. 17, 1999.

(51) Int. Cl.[7] ................................................. G11B 5/54
(52) U.S. Cl. ................................. 360/256.4; 360/256.5
(58) Field of Search .......................... 360/256.4, 256.5, 360/256.2

(56) References Cited

U.S. PATENT DOCUMENTS

| 5,870,256 | A | * | 2/1999 | Khanna et al. | .......... | 360/256.4 |
| 5,875,075 | A | * | 2/1999 | Hickox | .................... | 360/256.4 |
| 6,091,587 | A | * | 7/2000 | Hatch et al. | ............. | 360/256.4 |

* cited by examiner

*Primary Examiner*—Robert S. Tupper
(74) *Attorney, Agent, or Firm*—Irell & Manella, LLP; Jeffrey P. Aiello

(57) ABSTRACT

A single latch that can secure an actuator arm when a hard disk drive has a clockwise rotational acceleration, or a counterclockwise rotational acceleration. The latch has a first end that can engage a first latch portion of the actuator arm when the disk drive has a clockwise rotational acceleration. The same latch also has a second end that can engage a second latch portion of the actuator arm when the disk drive has a counterclockwise rotational acceleration.

5 Claims, 4 Drawing Sheets

SINGLE LEVER BI-DIRECTIONAL INERTIA LATCH

This application claims the benefit of provisional application No. 60/166,089, filed Nov. 17, 1999.

BACKGROUND OF THE INVENTION

1. Field of the Invention

The present invention relates to an actuator arm latch for a hard disk drive.

2. Prior Art

Hard disk drives contain a plurality of transducers that are magnetically coupled to rotating magnetic disks. The transducers can write and read information onto the rotating disks by magnetizing and sensing the magnetic field of the disks, respectively. The transducers are integrated into heads that are part of a head gimbal assembly (HGA). The HGAs are typically attached to an actuator arm that is pivotally mounted to a base plate of the drive.

Information is typically stored within a plurality of data sectors. The data sectors are located within annular tracks of the disks. The actuator arm has a voice coil that is coupled to a magnet assembly mounted to the base plate. The voice coil and magnet assembly together define a voice coil motor. The voice coil motor can be energized to pivot the actuator arm and move the transducers to different annular tracks of the disks.

Hard disk drives can be integrated into computer systems that undergo rotational acceleration. For example, a drive may be integrated into a portable computer that is moved by the user during operation of the drive. Movement of the portable computer may induce a rotational acceleration of the disk drive. The rotational acceleration of the disk drive may cause the actuator arm to move about the drive and damage disk drive components. There have been developed a number of latches that secure the actuator arm and prevent undesirable arm movement. The latch is engaged when the heads are moved away from the disks.

FIG. 1 shows a magnetic latch 1 that can secure an actuator arm 2. The magnetic latch 1 is adjacent to a magnet assembly 3 that is coupled to a voice coil 4 of the arm 2. The actuator arm 2 includes a steel pin 5 that is magnetically attracted to the latch 1. The attractive magnetic force maintains the position of the actuator arm 2. The actuator arm 2 can only be separated from the latch 1 by providing enough current to the voice coil 4 to create a torque sufficient to overcome the magnetic force. This requires additional power for the hard disk drive, a criteria that is undesirable when used in a portable computer. Additionally, the use of a magnetic latch 1 may require complex actuator speed control that increases the software processing overhead of the drive.

FIGS. 2–4 show an inertia latch 10 that can secure an actuator arm 11 when the disk drive has clockwise rotational acceleration. The inertia latch 10 is normally biased in an open position away from the actuator arm 11. When the disk drive is not writing or accessing information the actuator arm 11 is rotated to park the heads 12 on a ramp 13. The arm 11 also engages a crash stop 14. When the disk drive has a clockwise rotational acceleration the actuator arm 11 moves in a counterclockwise direction. The latch 10 also moves in a counterclockwise direction until a latch hook 15 extends into a notch 16 of the actuator arm 11 as shown in FIG. 3 to secure the arm 11.

As shown in FIG. 4, the latch 10 will move back to the open position when the disk drive is no longer rotationally accelerating. If the hard disk drive has a counterclockwise rotational acceleration, the actuator arm 11 will swing past the latch 10 in a clockwise direction and possibly land on the disks (not shown). This type of latch 10 will not secure the actuator arm 11 for counterclockwise rotational acceleration.

FIGS. 5–7 show a dual lever latch 20 which has a large latch arm 21 that can move a small latch arm 22 into an actuator arm 23. The small latch arm 22 will engage the actuator arm 23 whether the disk drive has clockwise or counterclockwise rotational acceleration. When the disk drive is rotating in a clockwise direction the large latch arm 21 moves in a counterclockwise direction and a first latch pin 24 pulls the small latch arm 22 into the actuator arm 23. When the disk drive is rotating in a counterclockwise direction the large latch arm 21 moves in a clockwise direction and a second latch pin 25 pushes the small latch arm 22 into the actuator arm 23. The latch 20 will secure the arm 23 regardless of the rotational acceleration direction. This design requires multiple latch components that increases the complexity and cost of mass producing the disk drive.

BRIEF SUMMARY OF THE INVENTION

One embodiment of the present invention is a hard disk drive which has a latch that can engage an actuator arm. The latch has a first end that can engage a first latch portion of the actuator arm and a second end that can engage a second latch portion of the actuator arm.

BRIEF DESCRIPTION OF THE DRAWINGS

FIG. 11 is an enlarged top view of the latch.

DETAILED DESCRIPTION OF THE PREFERRED EMBODIMENT

In general the present invention includes a single latch that can secure an actuator arm when a hard disk drive has a clockwise rotational acceleration, or a counterclockwise rotational acceleration. The latch has a first end that can engage a first latch portion of the actuator arm when the disk drive has a clockwise rotational acceleration. The same latch also has a second end that can engage a second latch portion of the actuator arm when the disk drive has a counterclockwise rotational acceleration. Providing one latch reduces the complexity and cost for mass producing the disk drive.

Figure 1:
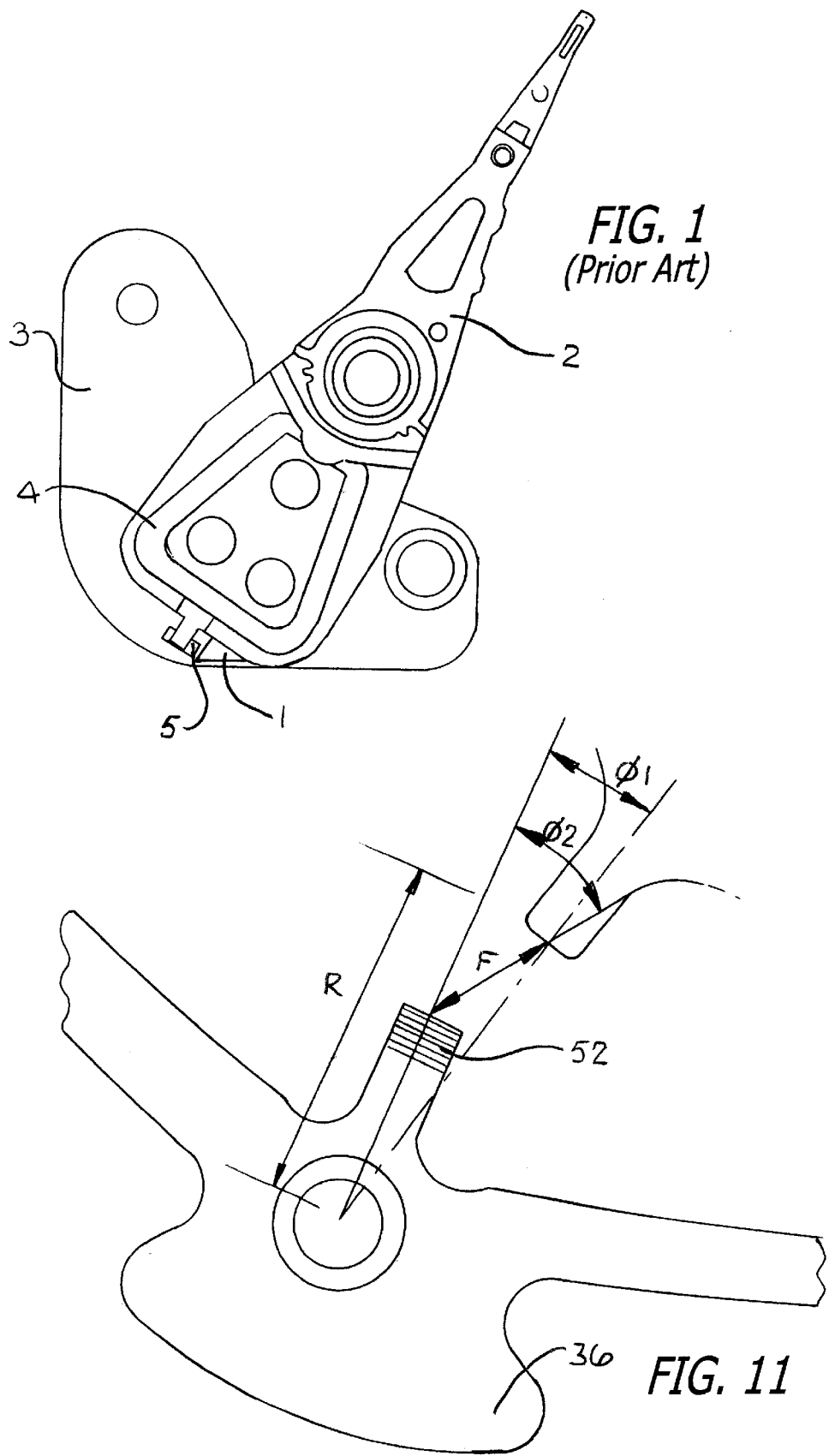
FIG. 1 is a top view of a hard disk drive actuator arm assembly of the prior art.
Figure 2:
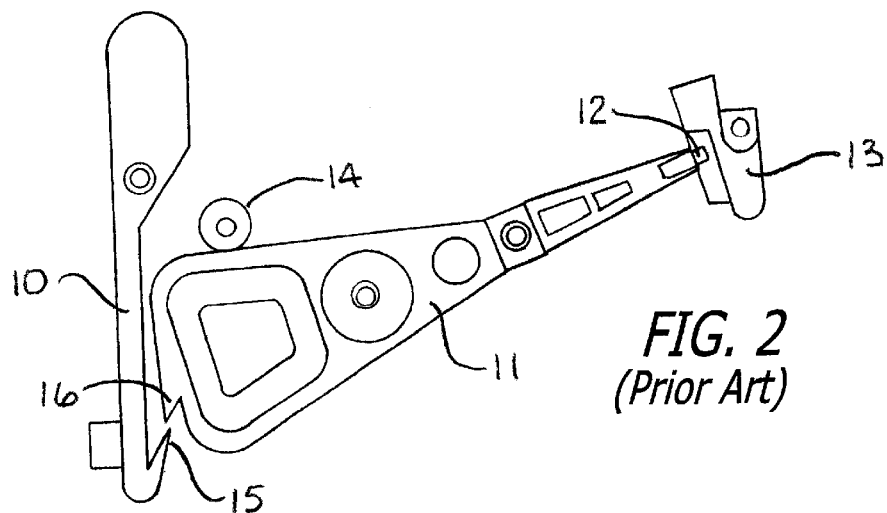
FIGS. 2–4 are top views of another hard disk drive actuator arm assembly of the prior art.
Figure 3:
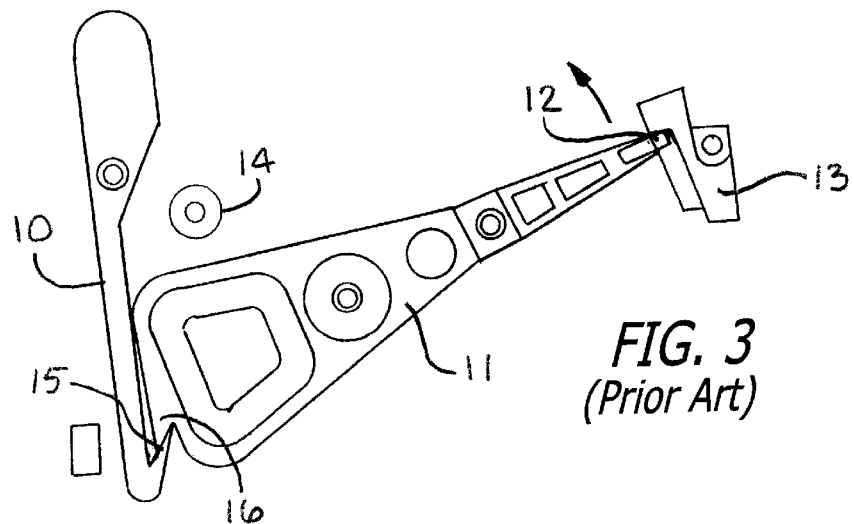
Figure 4:
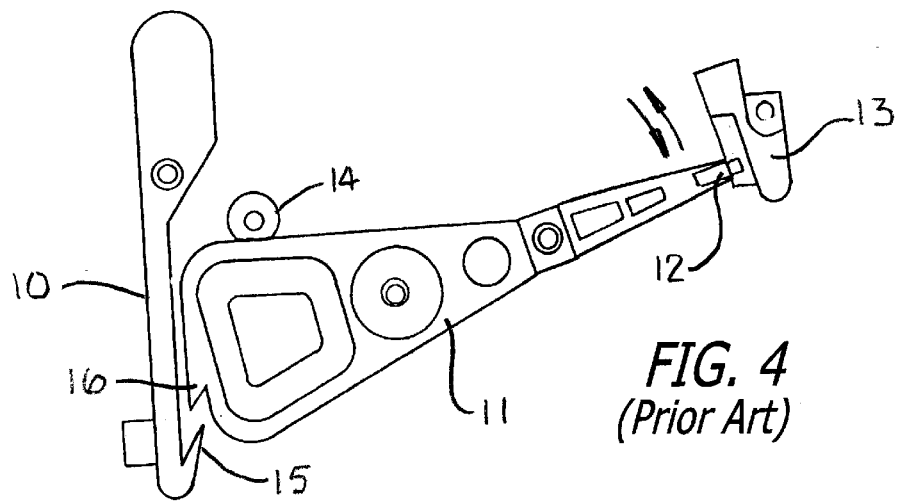
Figure 5:
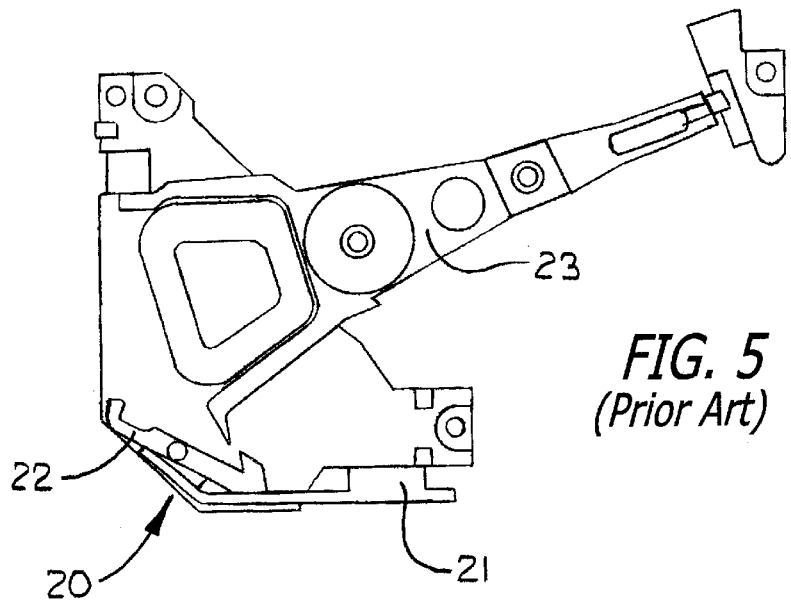
FIGS. 5–7 are top views of another hard disk drive actuator arm assembly of the prior art.
Figure 6:
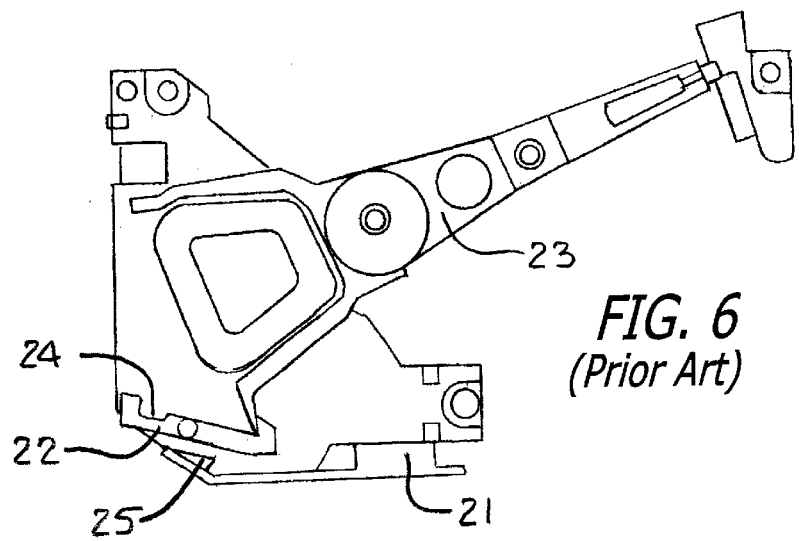
Figure 7:
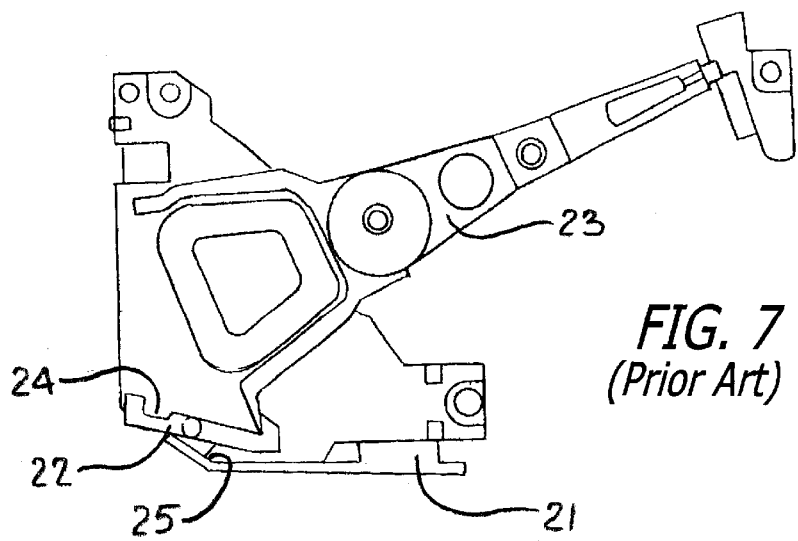
Figure 8:
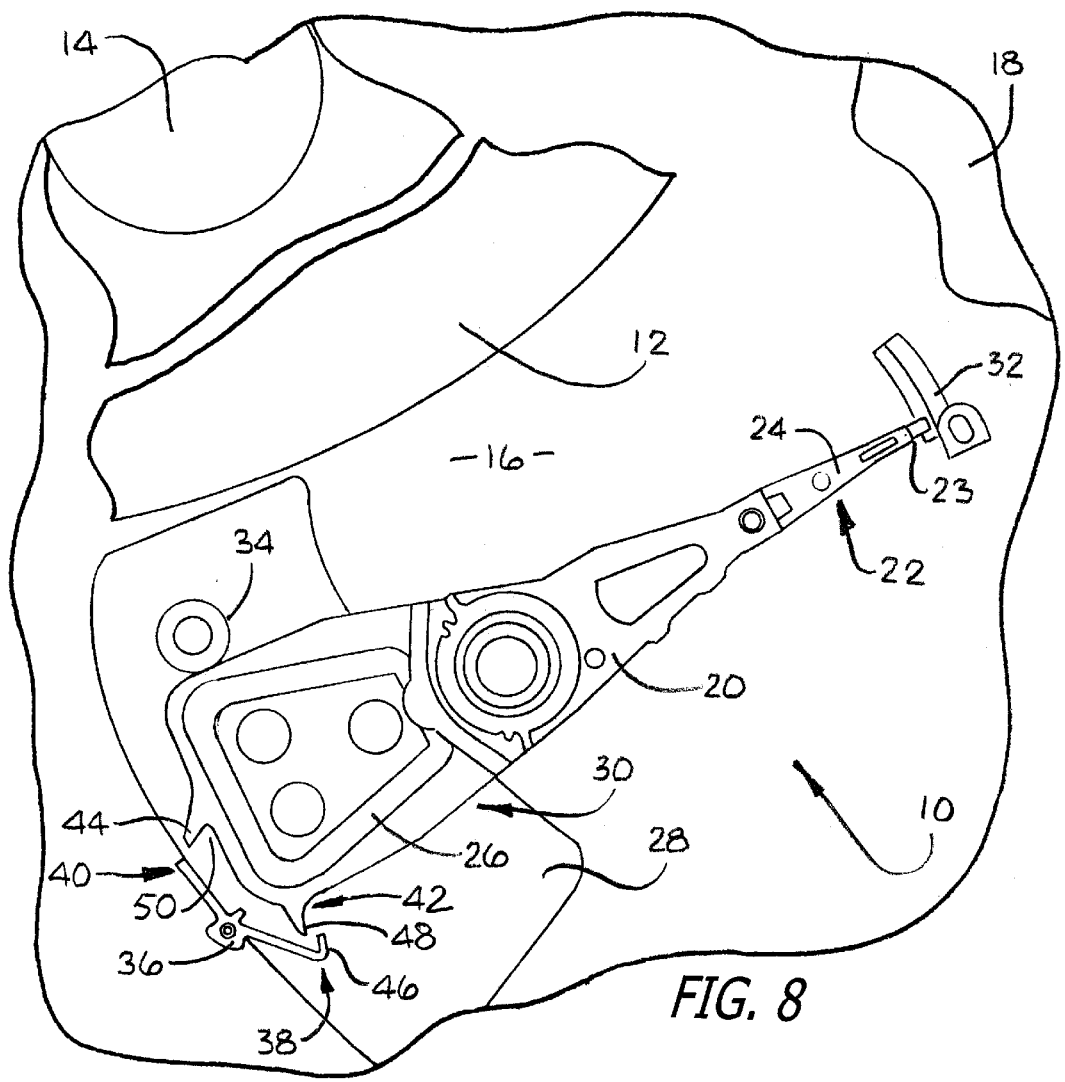
FIG. 8 is a top view of an embodiment of a hard disk drive of the present invention.

Referring to the drawings more particularly by reference numbers, FIG. 8 shows an embodiment of a hard disk drive 10 of the present invention. The hard disk drive 10 may include one or more disks 12 that are rotated by a spindle motor 14. The spindle motor 14 may be mounted to a base plate 16. The drive 10 may also have a cover 18 that is attached to the base plate 16 and encloses the disks 12.

An actuator arm 20 may be pivotally mounted to the base plate 16. A plurality of head gimbal assemblies (HGAs) 22 may be attached to the actuator arm 20. Each HGA 22 may include a head 23 that is gimbal mounted to a suspension arm 24. The suspension arms 24 are attached to the actuator arm 20. The heads 22 contain one or more transducers (not shown) that can magnetize and sense the magnetic field of the disks 20 to write and read information, respectively.

The disk drive 10 may include a voice coil 26 that is attached to the actuator arm 20 and coupled to a magnet assembly 28. The voice coil 26 and magnet assembly 28 define a voice coil motor 30 that can be energized to pivot the actuator arm 20 and move the heads 22 across the disks 12. The heads 22, spindle motor 12 and voice coil motor 30 may all be controlled by electronic circuits (not shown) that operate the disk drive, as is known in the art.

When the disk drive 10 is not storing or accessing information the voice coil motor 30 may be energized to move the heads 22 away from the disks 12 and onto a ramp 32 that is mounted to the base plate 16. The actuator arm 20 may also engage a crash stop 34.

The disk drive 10 may have a latch 36 that is pivotally mounted to the base plate 16. The latch 36 has a first end 38 and an opposite second end 40. The first end 38 may engage a corresponding first latch portion 42 of the actuator arm 20. Likewise, the second end 40 may engage a corresponding second latch portion 44 of the actuator arm 20. The first end 38 may include a hook 46 that engages a corresponding barb 48 of the first latch portion 42. The second end 40 may engage a corresponding notch 50 of the second latch portion 44.

Figure 9:
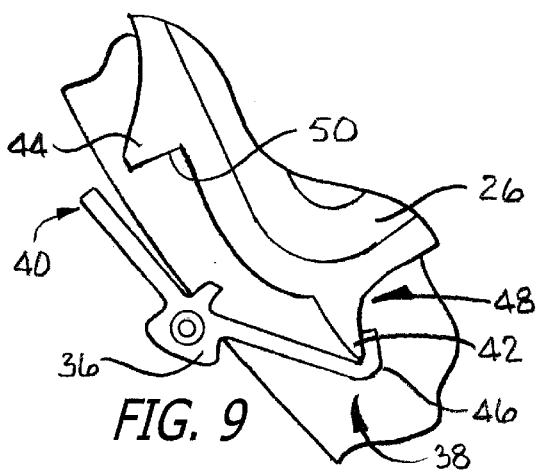
FIG. 9 is a top view of a latch engaging an actuator arm when the hard disk drive has a clockwise rotational acceleration.

As shown in FIG. 9, when the disk drive 10 has a clockwise rotational acceleration, the latch 36 will have a counterclockwise rotation so that the hook 46 engages the barb 48 and secures the actuator arm 30.

Figure 10:
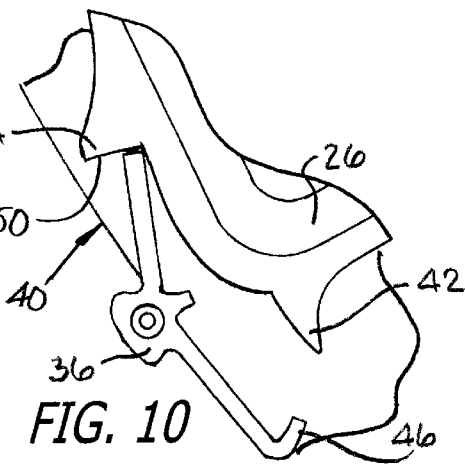
FIG. 10 is a top view of the latch engaging the actuator arm when the hard disk drive has a counterclockwise rotational acceleration.

As shown in FIG. 10, when the disk drive 10 has a counterclockwise rotational acceleration, the latch 36 will have a clockwise rotation so that the second end 40 engages the notch 50 and secures the actuator arm 30. The present invention thus provides a single latch 36 that can secure an actuator arm whether the disk drive has clockwise, or counterclockwise, rotational acceleration.

As shown in FIG. 11, the latch 36 may have a steel plate 52 that is attracted to the magnet assembly 28. The attractive magnetic force maintains the latch 36 in an open position so that neither end 38 or 40 engages the actuator arm 30 when, there is no rotational acceleration of the disk drive 10, or the rotational acceleration is below a threshold value. The threshold value may be a function of the restoration torque created by the magnetic force to move the latch 36 into the open position. The restoration force may be defined the following equation:

$$T = K \cdot (\emptyset 1)$$

$$T = F \cdot \sin(\emptyset 2) \cdot R$$

where;

T=the restoration torque.

F=the sum of the magnetic attractive forces.

R=the distance from the latch pivot to the magnet.

K=the torque constant.

$\emptyset 1$=the offset angle of the latch.

$\emptyset 2$=the angle between the latch axis and the magnetic attractive force direction.

The parameters defined in equation (1) can be varied to provide a desired restoration torque and a corresponding threshold acceleration before the latch 36 secures the actuator arm 30.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:

a base plate;

a spindle motor mounted to said base plate;

an actuator arm pivotally connected to said base plate, said actuator arm having a barb and a notch;

a latch having a hook on a first end that interconnects with said barb when the hard disk drive has a clockwise rotational acceleration and a second end which engages said notch when the hard disk drive has a counterclockwise rotational acceleration;

a head that is mechanically coupled to said actuator arm and magnetically coupled to said disk; and, a voice coil motor that can move said head relative to said disk.

2. The hard disk drive of claim 1, further comprising a crash stop that can engage said actuator arm.

3. The hard disk drive of claim 1, wherein said voice coil motor includes a magnet assembly and said latch includes a plate that is coupled to said magnet assembly to maintain said latch in an open position.

4. The hard disk drive of claim 1, wherein said latch is pivotally mounted to said base plate.

5. The hard disk drive of claim 1, further comprising a ramp that is attached to said base plate and is adapted to support said head.

* * * * *